United States Patent

Gancy et al.

[11] 3,904,733
[45] Sept. 9, 1975

[54] PREVENTION OF CALCIUM DEPOSITION FROM TRONA-DERIVED SODIUM CARBONATE LIQUORS

[75] Inventors: Alan B. Gancy; Rustom P. Poncha, both of Syracuse, N.Y.

[73] Assignee: Allied Chemical Corporation, New York, N.Y.

[22] Filed: June 20, 1973

[21] Appl. No.: 371,799

[52] U.S. Cl. .......................... 423/206 T; 423/423
[51] Int. Cl.² ........................................ C01D 7/22
[58] Field of Search ........... 423/419, 421, 422, 425, 423/426, 427, 438, 165, 184, 186, 196, 201, 206, 209, 430, 200 T; 210/46, 52

[56] References Cited
UNITED STATES PATENTS

| | | | |
|---|---|---|---|
| 2,292,503 | 8/1942 | Allen | 423/430 X |
| 3,131,996 | 5/1964 | Seglin et al. | 423/206 |
| 3,260,567 | 7/1966 | Hellmers et al. | 423/184 X |
| 3,425,795 | 2/1969 | Howard et al. | 423/201 |

OTHER PUBLICATIONS

Siewko, M. J. and Plane, R. A., *Chemistry*, 2nd Ed., McGraw Hill Book Company, Inc., N.Y., N.Y., 1961, p. 211.

*Primary Examiner*—Oscar R. Vertiz
*Assistant Examiner*—Gary P. Straub
*Attorney, Agent, or Firm*—Gerard P. Rooney; Jack B. Murray, Jr.

[57] ABSTRACT

A method of producing a concentrated sodium carbonate solution low in calcium from calcined natural trona to minimize the deposition of pirssonite on the surfaces of processing equipment exposed to the solution from which the insoluble impurities, normally present in natural trona, have been separated. The method comprises dissolving the calcined trona in a hot aqueous medium to form a concentrated solution containing insoluble impurities and soluble calcium salts and adding an amount of pirssonite effective to insolubilize the major portion of the soluble calcium in the sodium carbonate solution. The pirssonite may be added to the calcined trona either before, during or after its dissolution. The pirssonite may also be added by recycling excess muds back to the sodium carbonate solution from which the insoluble impurities have not been separated. In addition, the sodium carbonate solution may be aged in the presence of the contained insoluble impurities prior to their separation from the sodium carbonate solution to reduce the amount of soluble calcium salts.

9 Claims, 2 Drawing Figures

PREVENTION OF CALCIUM DEPOSITION FROM TRONA-DERIVED SODIUM CARBONATE LIQUORS

BACKGROUND OF THE INVENTION

Although by far the greatest tonnage of soda ash (anhydrous sodium carbonate) is produced by the well-known Solvay Process, an increasing amount is obtained from natural trona, large deposits of which are found in the vicinity of Green River, Wyoming at depths varying from 800 to 1800 feet. The trona beds are generally sandwiched between and sometimes in combination with stratifications of shale. The trona consists mainly of sodium sesquicarbonate ($Na_2CO_3 \cdot NaHCO_3 \cdot 2H_2O$), and typically contains from 4 to 20 percent insoluble matter. The latter consists largely of shale, but also contains calcareous minerals and other impurities.

A typical natural trona composition is given below:

| | |
|---|---|
| $Na_2CO_3$ | 41.8% |
| $NaHCO_3$ | 33.1% |
| $H_2O$ | 14.1% |
| | 89.0% |
| Insolubles: | |
| Dolomite $CaCO_3 \cdot MgCO_3$ | 5.5% |
| Quartz $SiO_2$ | 1.1% |
| Feldspar (K, Na) O $xAl_2O_3$ $ySiO_2 \cdot 7H_2O$ | 3.3% |
| Clay $2K_2O$ $3MgO$ $8Fe_2O_3$ $24SiO_2$ $12H_2O$ | 0.6% |
| Shortite $Na_2CO_3 \cdot 2CaCO_3$ | 0.1% |
| Organic Matter as Elemental Carbon | 0.2% |
| Other (by Difference) | 0.2% |

In the production of sodium carbonate from natural trona, the usual procedure is to calcine the mineral to obtain a crude sodium carbonate

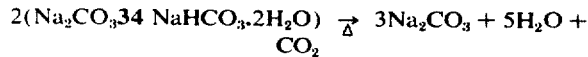

The sodium carbonate thus obtained is dissolved in an aqueous medium and/or recycled process liquors. The calcium salts present also dissolve to a slight extent, so that the final solution may contain up to about 50 parts per million (ppm), as calcium.

Unfortunately, these solubilized calcium salts later deposit from the slurry or solution on the surface of processing equipment, such as those of heat exchangers, pumps and lines, particularly in zones of high turbulence and high temperature.

The deposit is predominantly in the form of pirssonite ($Na_2CO_3 \cdot CaCO_3 \cdot 2H_2O$). This pirssonite scale is a compact, adherent crystalline mass which may vary in thickness from a thin film to a ¼ inch coating or more depending upon the time elapsed between treatments for removal of this scale.

Not only does this scale retard fluid flow and heat transfer, but it causes pitting, corrosion and the breakdown of moving parts. Because of its hardness and adherence this scale cannot easily be removed by mechanical means. The method used commercially to meet the problem of calcium deposition has involved equipment shut down, followed by thorough cleaning of the fouled lines and units with inhibited acid. This approach means costly down time and contributes to the corrosion and pitting initiated by the calcareous deposits.

It has now been found that calcium in solution is the net result of two simultaneous processes:

1. the decomposition of Ca-bearing trona minerals, and
2. the crystallization of pirssonite, the stable equilibrium calcium phase under the conditions of dissolving.

Surprisingly, the addition of small amounts of synthetic pirssonite to the dissolving system does not increase the amount of pirssonite deposition, but instead, rapidly reduces calcium supersaturation even in the presence of Ca-bearing muds, to a very low level. Also, surprisingly, the addition of phases structurally adjacent to pirssonite (gaylussite and several modifications of $CaCO_3$) have been found relatively ineffectual in reducing calcium supersaturation.

The pirssonite scale formation may be essentially prevented if the calcium level in the trona liquor can be reduced to about 15 ppm or less. Such reduction of the calcium ion in the sodium carbonate solution would, by essentially preventing the formation of pirssonite deposits in the processing equipment, introduce very significant savings in labor and equipment costs, and increase the productive output of the processing equipment.

SUMMARY OF THE INVENTION

When a small amount of the sodium calcium carbonate "pirssonite" ($Na_2CO_3 \cdot CaCO_3 \cdot 2H_2O$) is admixed with an aqueous solution of calcined trona containing insoluble matter, and the insoluble matter is separated from the sodium carbonate solution, the major portion of the solubilized calcium which normally would subsequently deposit on the surface of processing equipment, is insolubilized and removed from the solution along with the insoluble matter. The procedure provides a low calcium liquor inexpensively, by the addition of a small amount of pirssonite and requires no additional processing since the separation of the insoluble matter is a necessary step in conventional processes for preparing soda ash from calcined trona solutions.

More specifically, a method of the present invention for producing a concentrated solution of sodium carbonate from trona containing insoluble impurities and soluble calcium salts, to minimize deposition of pirssonite from the sodium carbonate solution from which the insoluble impurities have been separated, comprises calcining the trona, dissolving the calcined trona in an aqueous medium at a temperature between about 80° and 110°C., admixing an amount of pirssonite effective to insolubilize a major portion of the soluble calcium in the sodium carbonate solution and separating the insoluble solids from the concentrated solution. The pirssonite may be introduced or admixed before, during or after dissolution of the calcined trona. The term "aqueous medium" is intended to include water.

In another embodiment of our invention, the pirssonite is added to the sodium carbonate solution containing insoluble impurities by recycling an excess of the insoluble impurities (muds) containing pirssonite wherein the amount recycled comprises generally between 25 and 200 percent of the weight of insoluble impurities in the calcined trona feed to the dissolving zone.

In still another embodiment of our invention, the production of a low calcium, concentrated, sodium carbonate solution from trona which will deposit substantially no pirssonite on the liquid-contacting surfaces of the processing equipment, is accomplished by aging, that is, by retaining the solution in contact with the insoluble impurities for a sufficient time to effect reduction of the soluble calcium ions in the solution to less than about 15 parts per million. The practicality of this approach is rather surprising in light of the fact that in the past it was supposed that deposition of insoluble calcium salts from the concentrated sodium carbonate on the liquid-contacting surfaces of processing equipment could be lessened by removing the insoluble impurities or muds from the concentrated sodium carbonate solution as rapidly as possible.

DESCRIPTION OF THE PREFERRED EMBODIMENT

In the preparation of soda ash from natural trona, the trona is generally crushed to afford pieces predominantly larger than ½ inch in average diameter, but which will pass through a screen having 3 inch openings. The trona may be calcined at temperatures ranging from 125° to 800°C., but temperatures between about 125° and 200°C. are preferred. At temperatures in excess of 800°C. the impure sodium carbonate may begin to sinter. As may be expected, the crushed material will inevitably contain a considerable quantity of material having particle sizes less than ½ inch. A coarse, particulate calcined trona is preferred.

The calcined trona is dissolved in an aqueous medium such as water, or preferably, at least in part of an aqueous sodium carbonate solution comprising solutions, rinses and washes recovered from the soda ash process. The amount of aqueous medium used will be approximately that required to produce a substantially saturated solution of sodium carbonate at a temperature of about 80° to 110°C., preferably 85° to 100°C. The sodium carbonate content of the solution will be at least 20 percent or more, preferably between about 27 and 32 percent sodium carbonate. The residual heat of the calcined trona, added to the heat of solution of the anhydrous sodium carbonate, may heat the slurry above its boiling point, hence additional make-up dilute sodium carbonate solution, or water, may be required to replace that lost through vaporization.

A small quantity of pirssonite in an amount between about 0.1 and 5 percent of the weight of the dissolved calcined trona, preferably in an amount ranging from about 0.2 to 2 percent, is admixed with the solution containing solid impurities. An amount of pirssonite less than 0.1 percent is at least partially effective, and an amount greater than 5 percent is effective but provides no additional benefit. The solution is maintained at a temperature ranging from about 80° to 110°C., preferably from 85° to 100°C. The period of mixing may vary from a few minutes up to an hour or more, but mixing periods exceeding an hour provide no additional benefit. The solution, having suspended solids, is next transferred to clarifiers where the solids are separated from the sodium carbonate solution leaving only a minimal amount of dissolved calcium salts, namely less than about 15 parts per million (ppm) as Ca (based on the weight of the sodium carbonate solution), and generally less than 10 ppm. The downstream deposition of calcium, particularly pirssonite from a solution treated as above will be minimal or essentially nonexistent. If desired, the pirssonite can alternately be added to the calcined trona prior to its dissolution in the aqueous solution. The perssonite need not be pure, and may, if desired, be added in combination with other insoluble matter.

The concentrated sodium carbonate solution, substantially free of insolubles and containing less than about 15 ppm calcium, may be processed according to any of the commonly employed methods for the manufacture of soda ash. Generally this is accomplished by subjecting the purified sodium carbonate solution to a crystallization or series of crystallizations wherein sodium carbonate monohydrate crystals are obtained and calcined to produce a refined soda ash product.

The insoluble impurities or muds which are separated from the aqueous trona solution, even when pirssonite is not deliberately added to the solution, contain pirssonite, generally in an amount between about 2 to 5 percent based on the dry weight of the muds. We have now found that aging the solution with the muds alone provides a low calcium filtrate from which pirssonite will not subsequently deposit. In one embodiment of our invention the sodium carbonate solution from calcined trona with its insoluble impurities is aged for periods of between 2 to 5 hours or more, to effect the desired reduction of soluble calcium salts in the eventually clarified solution.

A combination of these two procedures can be employed wherein pirssonite is added either before, during or after dissolution of the calcined trona, and the insoluble impurities or muds are retained in intimate contact with the sodium carbonate solution for an extended period, before separation or clarification of said sodium carbonate solution. Less pirssonite need be employed in this combination procedure.

A process for producing a substantially saturated clarified aqueous sodium carbonate solution from calcined trona, said solution having a concentration of at least 20 percent by weight and containing less than about 15 ppm of calcium, to essentially eliminate deposition of pirssonite scale on the liquid-contacting surfaces of the processing equipment, is herein disclosed as a preferred embodiment of our invention.

The calcined trona is dissolved in an aqueous medium in a dissolving zone at a temperature preferably between about 85° and 100°C. to obtain an aqueous solution of sodium carbonate containing soluble calcium salts and insoluble matter as impurities. Preferably, the aqueous medium employed as a solvent is comprised, at least in part, of sodium carbonate solutions, rinses and washes recovered from the soda ash process.

A first stream of trona solution containing solids is continuously withdrawn from the dissolving zone and transferred to a thickening zone wherein said first stream is divided into two portions. In one portion, the concentration of the insoluble impurities is increased by separating therefrom, trona solution containing a lesser concentration of insoluble matter. This separated solution comprises the second portion of the divided first stream. Preferably, the thickening zone is a solids thickener and the concentrated or thickened portion is predominantly solid impurities or muds, whereas the remaining portion of the first stream may consist of trona solution, either without solids, or with contained solids diluted by the liquor separated from the thickened portion. The concentrated or thickened portion contains a quantity of solids, dry basis, equivalent to about 25 to 200 percent or more; preferably about 30 to 70 percent by weight, of the amount of solids in the calcined trona charged to the dissolving zone. This thickened portion is recycled to the dissolving zone.

The remaining portion of the first stream which now has a lesser density because of the greater amount of sodium carbonate solution associated therewith, is directed to a clarification zone.

A second stream of sodium carbonate solution containing insoluble impurities is also transferred directly from the dissolving zone to the clarifier in an amount to maintain a material balance within the system. The term "clarification zone" is here intended to encompass the final solids separation system.

The first stream which is transferred to the clarification zone, and the second stream transferred to the clarification zone are preferably combined and clarified to provide a clear sodium carbonate solution having less than 15 ppm of calcium. This solution is essentially incapable of depositing an appreciable film of pirssonite on the liquid-contacting surfaces of the processing equipment.

A better understanding of the process of our invention may be had by reference to the description of the accompanying drawings.

Figure 1:
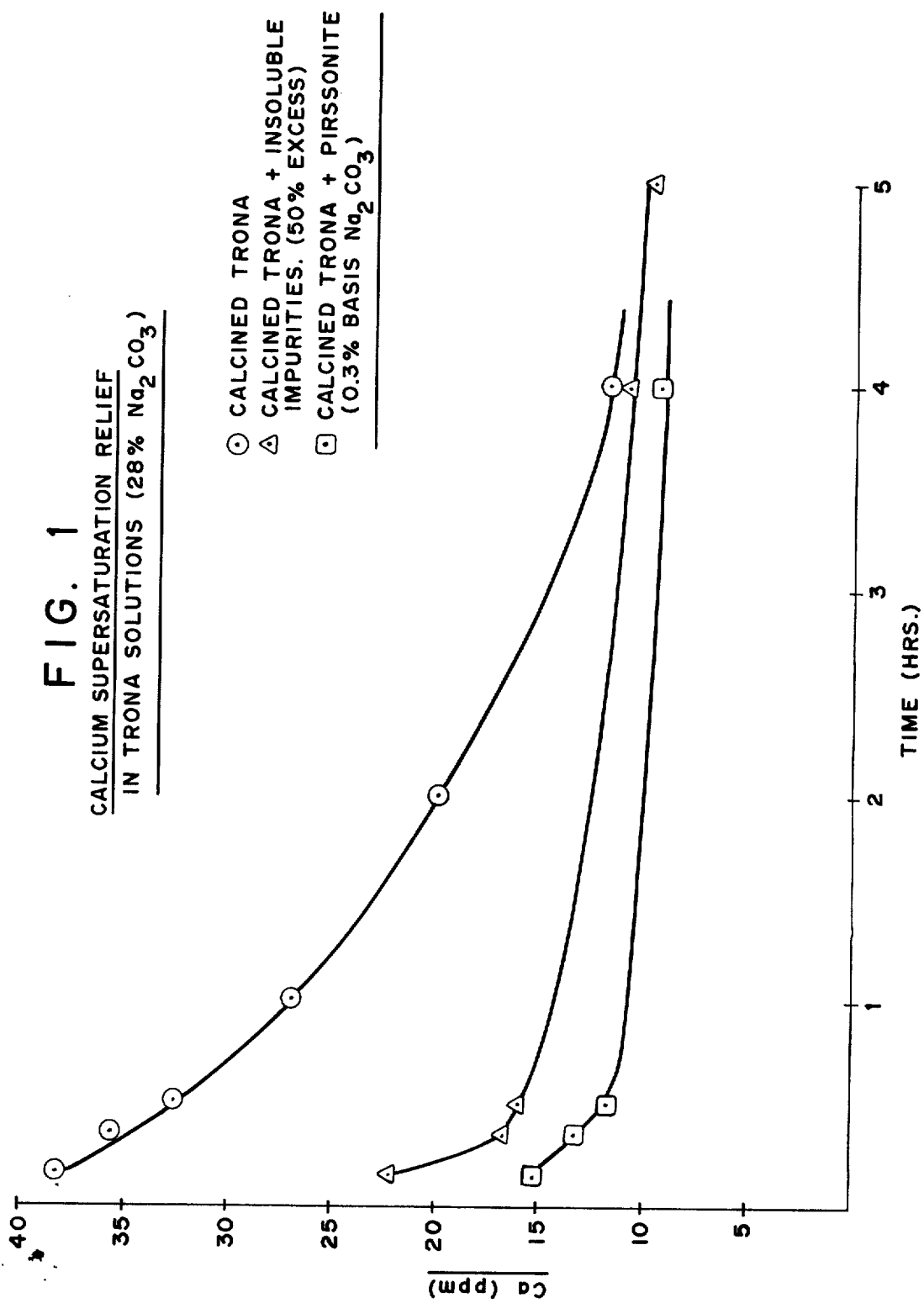
FIG. 1 graphically demonstrates the rapid reduction of calcium supersaturation when relieved by the direct addition of 0.3 percent pirssonite, and alternately by recycling clarifier muds (trona insoluble impurities) which have been shown to contain pirssonite. The muds are only slightly less effective than pure pirssonite.
Figure 2:
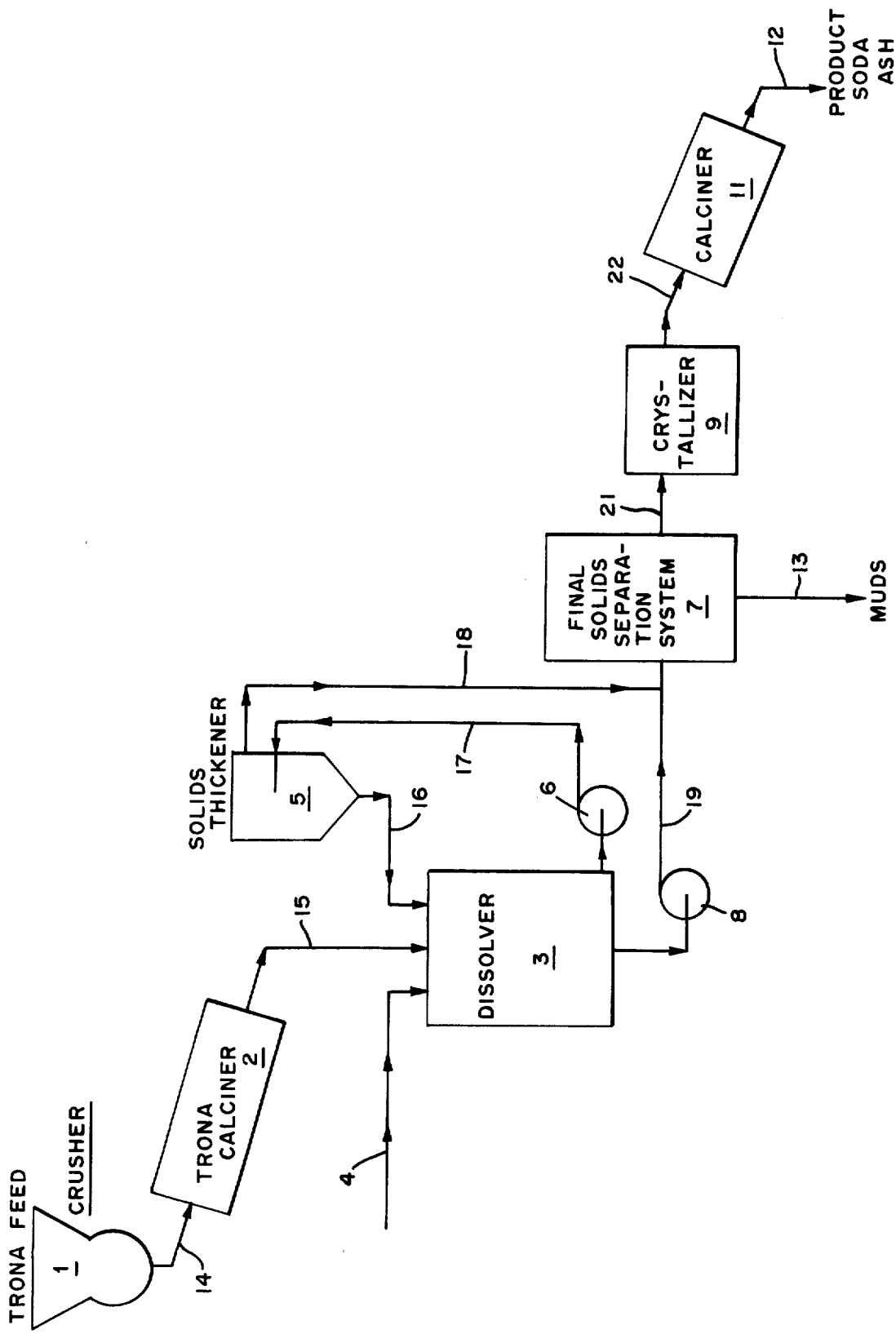
FIG. 2 is a highly simplified schematic flow diagram of a process for the production of soda ash from natural trona, drawn to illustrate particularly the recycling of the insoluble impurities from trona, which constitutes a preferred embodiment of our invention. In the diagram, a portion of the solution or slurry from the dissolver is thickened in a solids thickener, and the densified solid impurities are returned to the dissolver together with a small amount of sodium carbonate solution. Alternately, the solid impurities separated downstream during the classification, clarification or filtration steps could be recycled if desired.

With reference to the diagram, mined natural trona is fed into crusher 1 then to trona calciner 2 through line 14. The calcined trona is charged continuously to dissolver 3 through line 15 and an aqueous dissolving medium containing 0 to 15 percent or more sodium carbonate is charged through line 4. A 27 to 32 percent sodium carbonate solution is produced in dissolver 3 at a temperature of between about 85° and 100°C.

To illustrate the present invention, assume that over a unit of time, the charge comprises in total:

100 lbs. Insoluble impurities from trona
700 lbs. $Na_2CO_3$ and
1,590 lbs. $H_2O$
2,390 lbs. Total The sodium carbonate included above is composed of the $Na_2CO_3$ in the trona plus that contained in the 0 – 15 percent $Na_2CO_3$ solvent solution.

These materials are continuously charged into dissolver 3 together with recycled thickened insoluble materials continuously received from the thickening device (solids thickener) 5 through line 16. These recycled materials comprise:

60 lbs. Insoluble impurities

-continued
27 lbs. $Na_2CO_3$
63 lbs. $H_2O$
150 lbs. Total

The mixture which now contains about 30 percent $Na_2CO_3$ is agitated at a temperature of about 85° to 100°C. with a retention time (solution in contact with solids) of at least 20 minutes.

A first stream is continuously withdrawn from dissolver 3 per unit of time by pump 6 containing:

120 lbs. Solid impurities
546 lbs. $Na_2CO_3$
1,238 lbs. $H_2O$
1,904 lbs. Total This first stream is pumped through line 17 into solids thickener 5 which return about half of the solids to the dissolver. This half constitutes the recycled material listed above as leaving the solids thickener.

The other half of the above solids with its associated liquor is continuously directed to the final solids separation means 7 through line 18. This portion comprises:

60 lbs. Solids
519 lbs. $Na_2CO_3$
1,175 lbs. $H_2O$
1,754 lbs. Total

Simultaneously, a second stream is withdrawn from the dissolver by pump 8 and delivered through line 19 directly to the final solids separation system 7. This stream serves to maintain the material balance and comprises:

40 lbs. Solids
181 lbs. $Na_2CO_3$
415 lbs. $H_2O$
636 lbs. Total

The streams of sodium carbonate solution directed to the final solids separation system are combined and separated from the associated insoluble impurities or muds. The increased magma density in the dissolver results in an increased residence time for the insolubles and increases the relative concentration of pirssonite. Calcium supersaturation is therefore rapidly relieved, and the liquor attains non-scaling calcium levels.

In the schematic diagram, clear sodium carbonate solution leaves the final solids separation system 7 with a calcium content of less than about 15 ppm and passes to the crystallizer through line 21. The insoluble muds are discharged at 13. Water washes of these muds may be included in the aqueous medium used as a solvent for the incoming calcined trona.

The crystallization process is represented by block 9. The sodium carbonate monohydrate crystals from crystallizer 9 enter calciner 11 through line 22 where they are calcined at temperatures between about 125° and 200°C. to produce a purified soda ash product at 12.

EXAMPLES

General Experimental Procedure

Ground calcined trona ore assaying 87 percent $Na_2CO_3$ was used in all the examples. The solutions were prepared by adding 64.4 grams of the calcined ore to 144 milliliters (ml.) of deionized, millipore-filtered water contained in a 250 ml. volumetric flask to obtain a 28 percent $Na_2CO_3$ solution. The solution was stirred with a Teflon-coated magnetic stirrer and maintained at 90°C. by immersion in a thermostatically controlled oil bath. 10 ml. samples of the solution were withdrawn (after allowing the insolubles to settle for a few minutes) at definite time intervals, filtered through a 0.22 μ millipore filter and immediately diluted with 10 ml. deionized millipore-filtered water.

The solutions were analyzed for calcium by atomic absorption spectroscopy using a Perkin Elmer 303 Spectrophotometer employing a calcium hollow cathode lamp and air-acetylene fuel. The test solution was acidified to the methyl orange end-point and the absorption measured at 4227 angstroms after adding lanthanum chloride to suppress anionic chemical interferences. Standard prepared calcium samples were submitted periodically as a check on internal consistency. Calcium levels are reported at an accuracy of ± 1 ppm.

EXAMPLE 1

Slow Calcium Supersaturation Relief In Trona-Solution

The slow decrease in calcium level in untreated trona liquor (28 percent $Na_2CO_3$) is shown in Table 1.

TABLE 1

CALCIUM SUPERSATURATION RELIEF IN 28% ASH-FROM-TRONA SOLUTION - 90°C.

| TIME | CA, PPM |
|---|---|
| 10 minutes | 38.2 |
| 20 minutes | 35.7 |
| 30 minutes | 32.6 |
| 1 hour | 27.0 |
| 2 hours | 20.0 |
| 4 hours | 11.8 |
| 24 hours | 9.7 |

It is seen that the calcium level in the solution is reduced to the non-scaling value after 4 hours.

EXAMPLE 2

Rapid Calcium Supersaturation Relief In Trona Solutions By The Addition Of Pirssonite When small quantities of pirssonite are added to calcined trona during dissolution, there is a rapid reduction of calcium levels in the solution as shown in Table 2. The pirssonite samples consisted of scale from process lines, ground to −100 mesh. This pirssonite assayed better than 99 percent as determined by x-ray and chemical analysis.

TABLE 2

EFFECT OF ADDED PIRSSONITE ON CALCIUM SOLUBILITY IN 28% TRONA SOLUTIONS—90°C.

| % PIRSSONITE (BASIS $Na_2CO_3$) | TIME | | | |
|---|---|---|---|---|
| | 10 min. | 20 min. | 30 min. | 4 hrs. |
| | ca, ppm | | | |
| 0.0 | 38.2 | 35.7 | 32.6 | 11.8 |
| 0.1 | 24.6 | 22.1 | — | 12.3 |
| 0.3 | 15.5 | 13.4 | 11.7 | 9.6 |
| 0.9 | 17.7 | 12.3 | — | 9.6 |

It is seen that 0.3 percent pirssonite (basis $Na_2CO_3$) is quite effective in relieving calcium supersaturation in less than 20 minutes.

EXAMPLE 3

Rapid Calcium Supersaturation Relief In Trona Solutions By The Addition Of Trona Insoluble Impurities or Muds The pirssonite found in the trona insolubles was estimated by optical microscopy. The trona muds were found to contain approximately 2 – 5 percent pirssonite.

Dried muds were added to calcined trona during dissolution. The amount of muds added was equivalent to about 50 percent of the insolubles obtained when the calcined trona is dissolved in water to obtain 28 percent $Na_2CO_3$ solution, i.e., a 50 percent muds excess.

TABLE 3

EFFECT OF ADDED MUDS (50% EXCESS) ON CALCIUM SOLUBILITY IN TRONA SOLUTIONS (28% $Na_2CO_3$ — 90°C.)

| | TIME | | | | |
|---|---|---|---|---|---|
| | 10 min. | 20 min. | 30 min. | 4 hrs. | 5 hrs. |
| | Ca, ppm | | | | |
| No addition | 38.2 | 35.7 | 32.6 | 11.8 | — |
| Clarifier Feed Insolubles | 20.0 | 16.9 | 15.1 | 9.6 | 8.5 |
| Clarifier Muds | 22.3 | 16.8 | 16.3 | 12.0 | 10.6 |

It is seen that clarifier feed insolubles and clarifier muds added to calcined trona, as above, give calcium levels in the clarified liquors only slightly higher than those obtained on the addition of pirssonite (Example 2).

EXAMPLE 4

Effect Of High Concentrations Of Trona Muds On Calcium Supersaturation Relief

The effect of the addition of larger amounts (up to 200 percent excess) of trona muds are shown in Table 4.

TABLE 4

EFFECT OF ADDED TRONA INSOLUBLE IMPURITIES ON CALCIUM SOLUBILITY IN TRONA SOLUTIONS (28% $Na_2CO_3$ — 90°C.)

| | TIME | | | | | |
|---|---|---|---|---|---|---|
| | 10 min. | 20 min. | 30 min. | 1 hr. | 2 hrs. | 4 hrs. |
| | Ca, ppm | | | | | |
| No addition | 38.2 | 35.7 | 32.6 | 27.0 | 20.0 | 11.8 |
| 100% Excess Muds | 22.4 | 16.8 | 15.5 | 13.4 | 12.0 | 10.4 |

TABLE 4-continued

EFFECT OF ADDED TRONA INSOLUBLE IMPURITIES
ON CALCIUM SOLUBILITY IN TRONA SOLUTIONS
(28% $Na_2CO_3$ — 90°C.)

|  | 10 min. | 20 min. | TIME 30 min. | 1 hr. | 2 hrs. | 4 hrs. |
|---|---|---|---|---|---|---|
|  |  |  | Ca, ppm |  |  |  |
| 150% Excess Muds | 20.6 | 15.5 | 13.2 | 12.5 | 11.4 | 11.2 |
| 200% Excess Muds | 18.9 | 15.4 | 14.3 | 13.4 | 12.3 | 12.2 |

It is seen that an increase of up to 200% in muds concentration does not reduce the calcium levels significantly below that produced with 50% excess muds.

EXAMPLES 5 THROUGH 7

Effect of Calcium Compounds Other Than Pirssonite On Calcium Supersaturation

The addition of the calcium compounds tabulated in Table 5 below, which are broadly representative, were found to have substantially no effect on calcium supersaturation. Among those tested was gaylussite ($Na_2CO_3 \cdot CaCO_3 \cdot 5H_2O$) which is an adjacent phase to pirssonite ($Na_2CO_3 \cdot CaCO_3 \cdot 2H_2O$). Surprisingly, none of these compounds was appreciably effective.

TABLE 5

EFFECT OF VARIOUS CALCIUM COMPOUNDS ON CALCIUM SUPERSATURATION

| Example | Compound | Weight % Basis $Na_2CO_3$ | 10 min. | 20 min. | 30 min. | 4 hrs. | 5 hrs. | 6 hrs. |
|---|---|---|---|---|---|---|---|---|
|  |  |  |  |  | —Ca, ppm— |  |  |  |
| 5. | No addition | 0.0 | 38.2 | 35.7 | 32.6 | 11.8 | — | — |
|  | Gaylussite | 0.2 | 36.9 | 32.3 | 26.1 | — | 12.9 | 12.9 |
|  | Gaylussite | 0.3 | 38.4 | 32.3 | 26.1 | 14.0 | 12.9 | 12.3 |
| 6. | No addition | 0.0 | 38.2 | 35.7 | 32.6 | 11.8 | — | — |
|  | Calcite | 0.9* | 38.8 | 34.6 | 32.5 | 16.0 | 15.0 | — |
|  | Aragonite | 0.9* | 41.5 | 36.9 | — | 13.4 | — | 11.7 |
|  | Limestone (white) | 0.9* | 41.5 | 33.8 | — | 14.0 | — | 11.7 |
|  | Limestone (grey) | 0.9* | 41.5 | 36.9 | — | 13.4 | — | 11.2 |
| 7. | No addition | 0.0 | 38.2 | 35.7 | 32.6 | 11.8 | — | — |
|  | Calcium chloride | 0.3* | 45.5 | 30.5 | 23.4 | — | 11.9 | 10.0 |

*Pirssonite equivalent

Since changes can be made in carrying out the above process without departing from the scope of the invention, it is intended that all matter contained in the above description shall be interpreted as illustrative and not in a limiting sense.

We claim:

1. In a process for the production of soda ash from natural trona which comprises crushing the trona, calcining the crushed trona, dissolving the sodium carbonate values of the calcined trona in aqueous medium in a dissolving zone at a temperature of from about 80° to 110°C to provide a substantially saturated sodium carbonate solution containing soluble calcium ions and insoluble impurities, separating the insoluble impurities from said saturated sodium carbonate solution, crystallizing sodium carbonate monohydrate from said separated saturated sodium carbonate solution, separating the sodium carbonate monohydrate crystals and calcining the separated monohydrate crystals to produce soda ash, the improvement which comprises introducing pirssonite into said substantially saturated sodium carbonate solution, said pirssonite being introduced in an amount of between about 0.1 and 5% by weight, based on the weight of the dissolved calcined trona in the solution.

2. The process according to claim 1 wherein said pirssonite is introduced into said substantially saturated sodium carbonate solution in an amount of between about 0.2 and 2% by weight, based on the weight of the dissolved calcined trona in the solution.

3. The process according to claim 1 wherein the pirssonite introduced into said substantially saturated sodium carbonate solution is obtained by recycling to said solution insoluble impurities containing pirssonite.

4. The process according to claim 3 wherein the amount of insoluble impurities recycled to said solution is between 30 and 70% of the weight of insoluble impurities in the calcined trona.

5. In a process for the production of soda ash from natural trona which comprises crushing the trona, calcining the crushed trona, dissolving the sodium carbonate values of the calcined trona in aqueous medium in a dissolving zone at a temperature of from about 80° to 110°C to provide a substantially saturated sodium carbonate solution containing soluble calcium ions and insoluble impurities, separating the insoluble impurities from said saturated sodium carbonate solution, crystallizing sodium carbonate monohydrate from said separated saturated sodium carbonate solution, separating the sodium carbonate monohydrate crystals and calcining the separated monohydrate crystals to produce soda ash, the improvement which comprises: contacting said substantially saturated sodium carbonate solution with pirssonite-containing insoluble matter for a sufficient time to effect reduction of the soluble calcium ions in said saturated sodium carbonate solution to less than about 15 parts per million.

6. The process according to claim 5 wherein said pirssonite-containing insoluble matter comprises insoluble impurities produced in the dissolving of the calcined trona.

7. The process according to claim 5 wherein said pirssonite-containing insoluble matter is obtained by recycling to said dissolving zone insoluble impurities separated from said saturated sodium carbonate solution.

8. The process according to claim 5 wherein said substantially saturated sodium carbonate solution is contacted with said pirssonite containing insoluble matter for a period of between 2 and 5 hours.

9. In a process for the production of soda ash from natural trona which comprises crushing the trona, calcining the crushed trona, dissolving the sodium carbonate values of the calcined trona in aqueous medium in a dissolving zone at a temperature of from about 80° to 110°C to provide a substantially saturated sodium carbonate solution containing soluble calcium ions and insoluble impurities, separating the insoluble impurities from said saturated sodium carbonate solution, crystallizing sodium carbonate monohydrate from said separated saturated sodium carbonate solution, separating the sodium carbonate monohydrate crystals and calcining the separated monohydrate crystals to produce soda ash, the improvement which comprises: (a) separating the insoluble impurities from the saturated sodium carbonate solution by transferring a first portion of the saturated sodium carbonate solution from the dissolving zone to a thickening zone wherein said first portion is treated to concentrate the insoluble matter by separating therefrom sodium carbonate solution containing a lesser concentration of insoluble matter; (b) returning the concentrated insoluble matter to the dissolving zone in an amount of between 30 and 70% of the weight of the insoluble impurities in the calcined trona; (c) passing the separated sodium carbonate solution containing the lesser concentration of insoluble matter to a clarification zone; (d) transferring a second portion of the saturated sodium carbonate solution from the dissolving zone to the clarification zone; (e) clarifying the solutions transferred to said clarification zone to obtain a clear sodium carbonate solution containing less than 15 parts per million by weight of solubilized calcium salts; and (f) passing said clear sodium carbonate solution from the clarification zone to the crystallization zone for crystallization of sodium carbonate monohydrate from said solution.

* * * * *